United States Patent [19]

Ward et al.

[11] Patent Number: 4,722,980

[45] Date of Patent: Feb. 2, 1988

[54] METHOD OF INCREASING MOLECULAR WEIGHT OF POLY(ARYL ETHERS)

[75] Inventors: Mary V. Ward, Middlesbrough; Eric Nield, Cleveland, both of England

[73] Assignee: Imperial Chemical Industries, PLC, London, England

[21] Appl. No.: 918,979

[22] Filed: Oct. 15, 1986

Related U.S. Application Data

[62] Division of Ser. No. 607,308, May 4, 1984, Pat. No. 4,638,037.

[30] Foreign Application Priority Data

May 12, 1983 [GB] United Kingdom ............... 8313110

[51] Int. Cl.$^4$ ................... C08F 283/00; C08G 14/00; C08G 16/00; C08L 61/00
[52] U.S. Cl. .................................... 525/471; 525/534
[58] Field of Search ............................... 525/471, 534

[56] References Cited

U.S. PATENT DOCUMENTS 4,296,217 10/1981 Stuart-Webb ...................... 525/534

Primary Examiner—Lucille M. Phynes
Attorney, Agent, or Firm—Cushman, Darby & Cushman

[57] ABSTRACT

A method of increasing the molecular weight of a poly(aryl ether) comprising providing a mixture of (1) at least one polyaryl ether comprising polymer chains having end groups selected from groups of formula —Ar—X, preferably —Y—Ar—X and —Ar—OX and (2) a reagent having nucleophilic activity selected from (a) alkaline salts of Group I or Group II metals (as hereinafter defined) and (b) reagents have radicals —X and —OZ, reactive respectively with the end groups —Ar—OZ and —Ar—X, wherein when the end group is —Ar—X the reagent is either a difunctional reagent having either both end groups in the form of reactive —OZ groups or a difunctional reagent having one reactive —OZ group and one reactive —X group and when the end group is —Ar—OZ the reagent is a difunctional reagent having reactive end groups —X, and wherein Ar represents an arylene radical, preferably a phenylene radical, X is a monovalent radical capable of nucleophilic displacement from Ar, preferably selected from halogen, nitrile (CN) or nitro ($NO_2$) radicals, Y is an electron withdrawing group, which when Ar is phenylene is positioned ortho or para, preferably para to the X group and when Ar is not phenylene, X and Y are attached to the Ar group by parallel and oppositely directed bonds and Z is a univalent metal, and heating the mixture to a temperature above the melting point of the polymer until a desired increase in molecular weight has occurred. The method is useful for preparing fibre reinforced compositions and particularly for the process of impregnating fibre structures.

7 Claims, No Drawings

METHOD OF INCREASING MOLECULAR WEIGHT OF POLY(ARYL ETHERS)

This is a division of application Ser. No. 607,308 filed May 4, 1984 U.S. Pat. No. 4,638,037, Jan. 20, 1987.

This invention relates to a method of increasing the molecular weight of poly(aryl ethers) and to the polymers produced thereby.

Poly(aryl ethers) are organic polymers having etheric oxygen valently connecting aromatic nuclei. Such polymers have high temperature resistance, high thermal stability and if of sufficiently high molecular weight, are ductile. The present invention is concerned with a method of increasing the molecular weight of poly(aryl ethers). There are several reasons why such a method is of considerable value. In the first place it is sometimes difficult to achieve a sufficiently high molecular weight to obtain a ductile polymer in the normal polymerisation of the poly(aryl ether). A method of upgrading these low molecular polymers is consequently highly desirable. Secondly, in those cases where it is possible to obtain high molecular weights the melt viscosity of these products may be so high that fabrication of articles by the injection moulding process is difficult or impossible. In such cases it would be advantageous to mould a material of sufficiently low melt viscosity to achieve accurate mould reproduction and subsequently to increase the molecular weight of the polymer in the moulding by a heat treatment whilst in the mould. Such a process would be of particular value in a rotational moulding process. Yet again, polymers which are utilised at low molecular weights in order to obtain a sufficiently fluid melt for impregnation or coating purposes may advantageously be increased in molecular weight subsequent to the impregnation or coating process to improve the toughness of the polymer. The method is also useful for increasing the molecular weight of poly(aryl ethers) applied as melt adhesives or for encapsulation of articles such as electronic components.

According to the present invention there is provided a method of increasing the molecular weight of a poly(aryl ether) comprising providing a mixture of (1) at least one polyaryl ether comprising polymer chains having end groups selected from groups of formula —Ar—X, preferably —Y—Ar—X and —Ar—OZ and (2) a reagent having nucleophilic activity selected from (a) alkaline salts of Group I and Group II metals (as hereinafter defined) and (b) reagents have radicals —X and —OZ, reactive respectively with the end groups —Ar—OZ and —Ar—X, wherein when the end group is —Ar—X the reagent is either a difunctional reagent having either both end groups in the form of reactive —OZ groups or a difunctional reagent having one reactive —OZ group and one reactive —X group and when the end group is —Ar—OZ the reagent is a difunctional reagent having reactive end groups —X, and wherein Ar represents an arylene radical, preferably a phenylene radical, X is a monovalent radical capable of nucleophilic displacement from Ar, preferably selected from halogen, nitrile (CN) or nitro (NO$_2$) radicals, Y is an electron withdrawing group, which when Ar is phenylene is positioned ortho or para, preferably para to the X group and when Ar is not phenylene, X and Y are attached to the Ar group by parallel and oppositely directed bonds and Z is a univalent metal, and heating the mixture to a temperature above the melting point of the polymer until a desired increase in molecular weight has occurred. It will be appreciated that the group —OZ in either the polymer or the reagent can be provided by reaction of an end group —OH with an alkaline salt, hydroxide or oxide.

By an "alkaline salt" is meant a salt of a species having a pK value of at least 2.5 for the dissociation step or for the first dissociation step where the species is multifunctional or an oxide or hydroxide of a Group I or Group II metal. The salt may be in this form prior to heating in the presence of the polyaryl ether or the salt may be provided from precursors which generate an alkaline salt during the processing, and particularly as a result of the heating step. The alkaline salt should have sufficient thermal stability to retain nucleophilic activity at the temperature of the molten polymer. Dissociation constants of inorganic and organic acids are tabulated in Section D of the CRC Handbook of Physics and Chemistry, Editor R C Weast, published by CRC Press Inc, 62nd Edition.

The electron withdrawing group, —Y—, when present in the polyarylether, is preferably a group selected from those of formula —SO$_2$—, —CO—, —SO—, —N=N— and

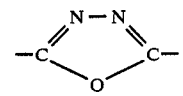

Such groups induce greater reactivity in the end group, —X—, as opposed to groups in the polymer chain, so that the reaction between the alkaline salt and end-group is favoured, leading to linear chain extension, rather than a reaction with a group in the chain, leading to branching.

When the poly(aryl ether) is derived from a polymer having at least one end group of formula —Ph—OZ appropriate reagents reactive with the —OZ radical are difunctional compounds, preferably having an activated group selected from halogen, —CN or —NO$_2$. A suitable reagent is, for example, bis-(4-halo phenyl) ketone.

The poly(aryl ether) present in the composition may consist of more than one type of poly(aryl ether). Chain extension of mixtures of polyarylethers will give rise to polymers made up of blocks of the original poly(aryl ether) chains. For example, a block copolymer of polyetheretherketone units and polyethersulphone units can be formed from a mixture of the two separate polymer types according to the invention in the presence of an alkaline salt. The separate polymer types should have end groups selected from halogen, nitro or nitrile, or the mixture should contain a reagent capable of forming such end groups on the polymers.

The Poly(aryl ethers) can be prepared by a variety of known processes. For example British Pat. Nos. 971 227, 1 016 245 and 1 060 546 describe polymers prepared by electrophilic aromatic substitution in which aromatically bound hydrogen is displaced as a proton by some form of aromatic sulphonylium cation, ArSO$_2$+, or aromatic carbonylium cation, ArCO+, derived from corresponding di or monoacyl halide using a Friedel-Crafts catalyst forming respectively a sulphone or ketone links.

A method involving nucleophilic aromatic substitution is disclosed in British Pat. No. 1 078 234 in which an alkali metal bisphenate is formed from a dihydric phenol and is then reacted with a dihalobenzenoid compound. The ether links are formed by displacement of halogen by the phenoxide anions. Polyarylethersulphones or polyaryletherketones are formed when one or both of bisphenate and the dihalobenzenoid compounds contain respectively a sulphone or a ketone group.

The preparation of polyaryletherketones by the methods described in the aforementioned patents leads to polymers of low molecular weight because the materials tend to precipitate from solution prematurely due to their high crystallinity. Polyaryletherketones of high molecular weight can be prepared using strong acid solvent systems as described in U.S. Pat. Nos. 3,442,857 and 3,953,400. These processes use hydrogen fluoride as the solvent and a boron trifluoride/hydrogen fluoride complex as the catalyst for the polymerisation. This process suffers from the disadvantage of being costly to operate and environmentally objectionable.

A less expensive process for making a high molecular weight polyaryletherketone of repeat unit —Ph—O—Ph—CO— (where —Ph— represents a para-phenylene unit) is disclosed in British Pat. No. 1 414 421 using an aromatic sulphone as solvent. A polyaryletherketone of repeat unit —Ph—O—Ph—CO—Ph—O—, (hereinafter termed PEEK) in which the relatively inexpensive hydroquinone provides one of the para phenylene residues is disclosed in European Patent Publication No. 1879.

In the present invention polyarylethers made, for example, according to any of the above patent disclosures, of any molecular weight, can be used as the starting material prior to increase in molecular weight providing that they have the requisite end groups as hereinbefore defined. Materials produced according to the disclosures outlined above do not necessarily have the desired endgroups as a result of the method of preparation. Such polymers must be end capped to provide a desired end group in order to make them suitable for use in the process. It is preferred that the polyaryl ether used should have an excess of either the end groups of formula —Ph—X or those of formula —Ph—OZ. It is preferred that the polymer used to mix with the alkaline salt should have a melt viscosity of between 5 and 100 Ns/m$^2$, preferably between 5 and 50 Ns/m$^2$, measured at a shear rate of 1000 sec$^{-1}$ and at a temperature below the melt decomposition temperature of the polymer. Although polymers with a melt viscosity below 5 Ns/m$^2$ can be used excessive amounts of alkaline salt are required to produce polymers of high molecular weight.

The invention is particularly useful for creating polymers of sufficiently high molecular weight to provide ductility starting from a low molecular weight polymer produced in a process which is incapable of giving a high molecular weight polymer in the normal polymerisation process because of the premature precipitation of the polymer from the reaction medium because of its high crystallinity.

Suitable alkaline salts of a Group I or II metal include a wide variety of salts, such as oxides, hydroxides, carbonates, and difunctional compounds containing a terminal phenate group. Other Group I and Group II metal salts include salts of sulphides, acid amides and sulphonamides. Mono functional monophenates are not effective for chain extension unless used in the presence of water or a compound capable of generating an alkaline salt as defined above. The effectiveness of chain extension appears to be promoted by the presence of water in most cases. The alkaline metal is preferably selected from sodium, potassium, calcium and magnesium, with potassium being the particularly preferred metal. In general, it is unnecessary to use more than 5% by weight of the alkaline of the salt, calculated as alkaline metal, relative to the polyaryl ether in order to achieve significant chain extension. It is preferable to use as little as possible to avoid as far as possible adverse effects arising from by-products of the chain extension reaction of the alkaline salt with the polymer. Generally, effective concentrations are in the range 0.005 to 1.0% by weight of the alkaline salt or precursor for the alkaline salt calculated as alkaline metal based on the polymer.

In one aspect of the invention there are employed metal salts of compounds having chemical compositions the same as or similar to the repeat units of the poly(aryl ether). With such compounds the chain extension reaction involves the incorporation of residues from the salt into the polymer chain which are the same or similar to the repeat units of the poly(aryl ether) and as a consequence the overall properties of the chain extended polymer are likely to be similar in character to polymers of high molecular weight made by conventional condensation polymerisation. Typical of such metal salts are compounds of the formula:

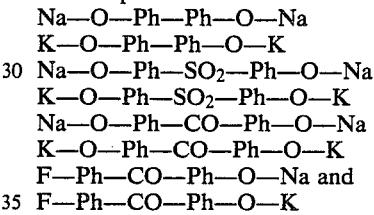

In order to effect the chain extension reaction the poly(aryl ether) must be maintained in the presence of the alkaline salt at a temperature at least equal to the melting point of the polymer. Preferably the temperature is maintained at least 20° C. above the temperature of the melting point of the polymer so that the rate of increase in molecular weight can be achieved within an economic timespan.

The extent to which the molecular weight is allowed to increase will depend on the particular application in mind. Where it is required that the end product should still be processable the conditions of reaction should be controlled so that cross-linking should not occur. Thus the chain extended product should be either a linear chain product or a lightly branched product which still has adequate melt flow characteristics to meet the requirements of the application in mind. On the other hand, in cases where a moulding is formed from the composition of poly(aryl ether) and alkaline salt and is subsequently heat treated in a mould to increase molecular weight, it may be advantageous to cross-link the product to enhance properties such as solvent resistance. In crystalline polymers it is preferred that the cross linking should not be so great as to result in the formation of a totally amorphous polymer.

The process of the invention may be carried out using compositions which contain a variety of auxiliary additives such as stabilisers, pigments, fire retardants, lubricants, fillers and reinforcing agents. Of particular interest are compositions containing fibrous reinforcing agents, such as glass fibres and carbon fibres.

The invention is of particular interest in the context of compositions reinforced with fibrous materials because the excellent physical properties of such compositions can be still further enhanced by treatment according to the invention. Although a variety of processes is known for producing reinforced compositions the present invention is particularly useful in the context of European Patent Publication No. 56703 which discloses that reinforced compositions having excellent physical properties can be obtained by impregnating continuous fibres with molten polymers having considerably lower melt viscosities than are normally considered advisable where an acceptable level of physical properties is required. It is necessary to use such abnormally low melt viscosities in order to achieve adequate wetting of the individual filaments of the fibres. As a consequence of this good wetting, exceptionally good mechanical properties are obtained from the compositions in spite of the low molecular weight polymer used. European Patent Publication No. 56703 also recognises that although the use of low molecular weight polymers give surprisingly good physical properties these properties may be enhanced still further by increasing the molecular weight of the matrix polymer after the impregnation stage. The present invention provides an excellent method of enhancing the physical properties after the impregnation stage.

In one aspect of the invention there is provided a method of enhancing the properties of a poly(aryl ether) composition containing reinforcing fibres comprising introducing into the composition an alkaline salt of a Group I or Group II metal, as hereinbefore defined, in concentration equivalent to at least 0.005% by weight of the metal of the salt based on the polymer of the composition so that it is available on the surface of the fibres or within the polymer of the composition and maintaining the composition at an elevated temperature at which the poly(aryl ether) is molten for a sufficient time to permit the molecular weight of the poly(aryl ether) to increase. In the context of reinforced compositions optimum properties may be obtained when the molecular weight has been increased to a relatively low level. Thus good properties are obtained when the melt viscosity of the polyaryl ether has been raised to the range 60–95 Ns/m$^2$ particularly when the poly(aryl ether) is PEEK. The melt viscosity of the polyaryl ether prior to contact with the alkaline salt is preferably between 5 and 50 Ns/m$^2$.

This aspect of the invention is not limited to the enhancement of the compositions disclosed in European Patent Publication No. 56703 in which parallel aligned fibres are impregnated but is applicable to all forms of reinforced composition in which the reinforcing fibres may be randomly disposed or aligned and, optionally woven.

The alkaline metal salt may be introduced into the fibre-reinforced composition by a variety of methods. In a very simple method a composite material or a shaped article formed from the reinforced composition can be coated with a suitable form of the alkaline salt, for example by deposition from solution, and then raised to a temperature at which the polymer of the composition is molten. This method is particularly suitable for composites or shaped articles having a thickness of less than 5 mm because of the need to distribute the alkaline salt as uniformly as possible throughout the matrix polymer. For this reason the method is particularly useful where the alkaline salt is applied to the surface of prepreg materials, that is impregnated strips which are subsequently grouped together or laid up such as by weaving and subjected to heat and pressure to consolidate them into a shaped article. A disadvantage of this method is the difficulty of ensuring thorough distribution of the effective alkaline salt and for this reason the salt is usually employed in conjunction with a wetting aid to provide easier impregnation of the composition. The major benefit of this version of the method is that the impregnation of the fibres with the polymer can be carried out at an earlier stage of the process using a low viscosity polymer without substantial risk of the polymer increasing in viscosity during the impregnation process which can arise to some extent if the alkaline salt is present during this stage of processing.

It will be appreciated that in the methods of impregnation described in European Patent Publication No. 56703 it could be disadvantageous if the presence of an alkali metal salt caused an increase in melt viscosity of such magnitude as to prevent substantially complete impregnation of the filaments of the fibres. Nevertheless the process of the invention can be usefully employed even when the alkaline salt is present at a stage in the process prior to complete impregnation. Preferably, in this aspect of the invention the alkaline salt is introduced to the composition by providing the filaments of the reinforcing fibre with a surface coating of alkaline salt. In this situation the fibres can be contacted with low viscosity melt and wetted thereby, before the alkaline salt has had sufficient time to increase the molecular weight of the polymer. It is normally found that the molecular weight increases after the impregnation stage to values which give enhanced physical properties in the course of the usual subsequent operations, such as, forming consolidated sheet from prepreg products and/or subsequent shaping of the consolidated sheet.

As an intermediate product for use in the process of the invention in which an alkaline salt coated fibre is impregnated with a molten thermoplastic polyaryl ether there is provided a reinforcing fibre, particularly a reinforcing carbon fibre, the filaments making up the fibre having a coating of an alkaline salt of a Group I or Group II metal at a concentration of at least 0.005 by weight of the metal of the salt based on the weight of fibre.

Yet again it is possible to use a method in which the alkaline salt is dispersed in the polymer melt prior to the impregnation stage providing the impregnation is completed sufficiently quickly for thorough impregnation to be achieved before any substantial increase in molecular weight prevents thorough impregnation.

The effectiveness of the introduction of the alkaline salts into the reinforced compositions is particularly surprising in view of the generally held view that the high temperature stability of carbon-fibre-reinforced composites is adversely affected by the presence of sodium salt contamination in carbon fibre. A paper entitled "Carbon Fibre Structure and Stability Studies" given at the 33rd Annual Technical Conference of the Reinforced Plastics/Composites Institute, The Society of Plastics Industry Inc, details this effect for various commercial carbon fibre types. For this reason most carbon fibre manufacturers take steps to remove metal salt contamination from their products which are to be used in high temperature applications. At least one manufacturer supplies carbon fibre which contains a substantial sodium content. When the invention is used to produce fibre reinforced compositions it is preferred that the concentration of alkaline salt is not so high as to bring about an excessive molecular weight increase which might impair the thermoformability of the reinforced product. Excessive molecular weight increases could lead to at least partial cross-linking of the poly(aryl ether). The extent of the reaction can be characterised by differential scanning calorimetry techniques (DSC). In the technique used in evaluating the products of the invention the crystallisation behaviour of the product produced from the impregnation stage with molten polymer is compared with the product obtained by compression moulding layers of this prepreg to form a consolidated moulding under standard conditions. This moulding treatment approximates to the moulding treatment that will be experienced in fabricating articles from the composites. The moulding treatment used in the production of the mouldings described in the examples were prepared by placing ... layers of 5 cm × 15 cm prepreg material (approximately 0.13 mm thick) in a matched metal mould, holding the layers at 400° C. for 15 minutes to ensure equilibrium and then pressing for 5 minutes at a pressure of 5 tons before cooling to room temperature over 15 minutes. The crystallisation properties of the prepreg and the resulting mouldings are compared by subjecting 10 mg samples, held in an aluminium pan, to a temperature of 420° C. for 2 minutes prior to cooling at 16° C./min using a Perkin Elmer DSC 1B machine. After heating to 420° C. for 2 minutes the edges of the pans were crimped over to retain the samples in a fixed position during the cooling cycle.

The quantity of alkaline salt or precursor thereof should be such that the difference between the Tc values of the material of the moulding and the prepreg should be not greater than 40° C., preferably not greater than 30° C., and more desirably not greater than 15° C. The difference between the Ts and Tc values should be not greater than 20° C., preferably not greater than 15° C. in either the prepreg or the moulding.

The DSC parameters give a measure of the extent to which the molecular weight has increased between the formation of the prepreg and the fabrication of consolidated mouldings from the prepreg at a given concentration of alkaline salt. In addition the parameters give a measure of the effect of concentration of alkaline salt on the increase of molecular weight. It is preferred that no further increase in molecular weight is able to occur after the moulding has been consolidated, so that any subsequent thermoforming operations can be carried out, without altering the molecular weight of the matrix to any substantial extent. The quantity of alkaline salt or precursor thereof should therefore have an upper limit of concentration which ensures that the difference between the Tc values for a given prepreg and the consolidated moulding prepared from the prepreg is not greater than 40° C., preferably not greater than 30° C. and more desirably not greater than 15° C., alternatively, and/or additionally, the difference between the Ts and Tc values for either the prepreg or the composite moulding should be not greater than 20° C. and preferably not greater than 15° C. and that the values do not increase substantially when the composite is subjected to prolonged additional treatment above the melt temperature of the poly(aryl ether).

In the general case these parameters are measured on a prepreg material and the same material after being held at 20° C. above the melting point of the poly(aryl ether) for 5 minutes after reaching the holding temperature and the values obtained should not increase when subjected to further heating at the holding temperature. It is preferred that the carbon fibre used is substantially free from alkaline salt contamination because such contamination is usually present throughout the carbon fibre and may not be available for reaction with the poly(aryl ether) under controllable conditions. Thus whereas the use of a carbon fibre carrying a surface coating of an alkaline salt can be used in a controllable manner because all the alkaline salt is effectively available for reaction with the polymer, this is not the case if a substantial quantity of alkaline salt or precursor thereof is embedded within the carbon fibre. Although this may migrate out and become active, i.e. converted to an alkaline form, this is likely to be a slow process. In this situation a reactive species may be present after a shaped article has been formed from the composition or prepreg which species is available for adventitious reaction during the subsequent lifetime of the article. For example, reprocessing of scrap material may result in further reaction which may result in excessive chain extension leading to difficult processing, even to the point of producing a cross-linked unprocessable composition. A similar situation may exist if it is desired to repair damage in a shaped article by melting and reforming the damaged areas.

The use of carbon fibres which, as supplied, are substantially free from alkaline salts or precursors for alkaline salts enables more effective and reproducible chain extension to be effected because the quantity of alkaline salt to be used can be chosen as that most suitable for the particular grade of poly(aryl ether) employed and can be introduced into the system at the most effective location, that is on the fibre surface or within the polymer matrix.

Nevertheless, the invention also includes the use of carbon fibre already containing such materials in compositions in which further alkaline salt or precursor thereof, which may be the same or different to that already present in the as-supplied fibre, is introduced either on the surface of the fibre or within the polymer of the composition. Such fibres may be used in applications in which the reproducibility of the properties is less critical. It is preferred that the fibre contains less than 0.4% by weight of the metal of the alkaline salt or its precursor prior to coating with additional alkaline salt.

A particularly preferred class of carbon fibre is that known as high modulus carbon fibre. This has a very low content of metal or metal salt contamination in the surface layers of the fibre and additionally is more effective at inducing crystallisation of polymers such as PEEK than other classes of carbon fibre.

The concentration of alkaline salt added to the reinforced compositions should be equivalent to at least 0.005% by weight of the polymer expressed by weight of the metal of the alkaline salt in addition to any alkaline salt or alkaline salt precursor present on or in the fibre as a result of its method of production. It is preferred that where the fibre used is substantially free of alkaline metal salts at the surface of the fibre that a concentration of salt equivalent to at least 0.01% by weight of salt, calculated as metal ion, is present in the composition. As previously indicated this may be introduced as a coating on the fibres or may be introduced via the polymer or the prepreg material.

The concentration of reinforcing fibre in the compositions may vary between wide limits and may be as low as 10% by weight of the composition but the invention is of particular value in compositions containing high concentrations, i.e. in excess of 40% by weight of fibres, which are difficult to impregnate thoroughly with polymeric melts of conventional molecular weight.

The properties of the reinforced compositions which are particularly enhanced by the process of the present invention are those which are influenced by the nature of the matrix of the composition. Thus, for composites reinforced with unidirectional, aligned fibres the flexural strength transverse to the longitudinal direction of the fibres may be very significantly improved.

In addition, the invention is useful for preparing granules or pellets containing reinforcing fibre. A particularly useful route to such pellets is by chopping continuous products having aligned fibres. The process of the invention enables excellent impregnation of the fibres to be effected with low molecular weight polymer impregnants, which can subsequently be increased in molecular weight.

The invention is further illustrated by reference to the following examples.

EXAMPLE 1

Poly(etheretherketone) powder (10 g) having a melt viscosity at 400° C. of 25 Ns/m$^2$, measured at a s hear rate of 1000 sec$^{-1}$, was blended in the presence of sufficient methanol to produce a slurry with 1.0 g of an aqueous solution of an alkaline salt of formula F—Ph—CO—Ph—ONa wherein Ph represents a paraphenylene unit. The aqueous solution contained 0.54 g of the salt. After drying under vacuum at 120° C. 1 g portions of the composition were compression moulded at 400° C. and held in the mould at 400° C. for periods varying between 5 and 30 minutes. After 5 minutes the film produced showed signs of having increased toughness compared with a film produced from the same polymer but not containing the salt. After 10 minutes pressing there were signs of increased toughness. After 30 minutes the film was transformed to a tough, pliable film.

EXAMPLE 2

Poly(etheretherketone) powder (10 g) having a melt viscosity at 400° C. of 25 Ns/m$^2$ was blended with the disodium salt of 4,4'-dihydroxybenzophenone (8 ml of aqueous solution containing 0.1 g of salt) and methanol (10 ml). After vacuum drying at 120° C. the composition was charged to a ram extruder maintained at 400° C. The ram extruder was provided with a die of diameter 1.81 mm and a load of 2.16 kg was applied to the ram. After allowing 5 minutes for the mixture to melt the melt viscosity was recorded at intervals of 5 minutes. After 10 minutes the melt viscosity had increased from 25 Ns/m$^2$ to 52 Ns/m$^2$. After 20 minutes a value of 58 Ns/m$^2$ was reached. Thereafter the melt viscosity increased only slowly up to a period of 1 hour.

EXAMPLE 3

A number of alkaline inorganic salts were mixed with portions of the poly(etheretherketone) powder used in Example 1 and the compositions produced evaluated for the effect on melt flow rate (MFR) when held in a ram extruder for prolonged periods at 400° C. The general method of ASTMD 1238 was used except in that the die used had a diameter of 1.181 mm (standard length). The table below records the additive used and the effect on MFR.

| Additive | Melt flow Rate at time (min) | | | |
| --- | --- | --- | --- | --- |
|  | 5 | 15 | 30 | 60 |
| 1% CaO | 55 | 45 | — | — |
| 1% Ca(OH)$_2$ | 35 | 6 | — | — |
| 0.5% Ca(OH)$_2$ | 53 | 25 | 15 | 4.5 |
| 1% CaCO$_3$ | 63 | 61 | — | — |
| 1% MgO | 54 | 42 | — | — |
| 0.5% Mg(OH)$_2$ | 49 | 40 | 31 | — |
| 1% Calcium acetate | 60 | 46 | — | — |
| Control | 69 | 67 | — | — |

The composition containing 0.5% Ca(OH)$_2$ emerging from the extruder after 60 minutes was found to be a tough, ductile material. The product was soluble in diphenyl carbonate indicating that no substantial crosslinking had occurred.

The procedure was repeated using sodium and potassium carbonates and starting with a PEEK powder having a melt viscosity of 34 NS/m$^2$ measured at 1000 sec$^{-1}$. The following results were obtained.

| Additive | Melt Flow Index at time (min) | | | |
| --- | --- | --- | --- | --- |
|  | 0 | 5 | 15 | 30 |
| 0.1% Na$_2$CO$_3$ | 45 | 41 | 39 | 36 |
| 0.05% K$_2$CO$_3$ | 45 | 37 | 32 | 28 |
| 0.1% K$_2$CO$_3$ | 45 | 26 | 22.5 | 21 |
| 0.25% K$_2$CO$_3$ | 45 | 10.5 | 9.5 | 8 |
| 0.5% K$_2$CO$_3$ | 45 | 3 | 1 | NIL |
| Control | 45 | 44 | 43 | — |

EXAMPLE 4

A reinforced composite strip 5 cm wide, containing 55% by vol of carbon fibre, was prepared according to the procedure described in Example 32 of European Patent Publication No. 56703 from a poly(etheretherketone) having a melt viscosity of 30 Ns/m$^2$ at 400° C. and a carbon fibre obtained from Hercules Corporation designated 'AS4' carbon fibre. This fibre is believed to be substantially free of metal salts or precursors for metal salts on the surface of the fibre. Analysis by the technique of Electron Spectroscopy for Chemical Analysis (ESCA) as described in the Handbook of X-ray and Ultra Violet Electron Spectroscopy, edited by D Briggs published by Heyden, London 1977, indicated no detectable concentration ($<0.2$ atomic %) of any metal in the surface layers of the fibre. The prepreg strip produced was cut to 15 cam lengths and immersed in an aqueous solution of wetting agent (Synperonic N) (0.15% by weight of water) and potassium carbonate (0.2% by weight of water). The strips were left to dry in air for several hours at ambient temperature. The dried prepregs had a concentration of potassium carbonate of about 0.1% by weight of polymer. The prepreg strip was compression moulded by superimposing 19 of the strips, with the fibres uniaxially aligned, in a matched mould. The strips were compression moulded at 400° C. using the following cycle. The strips were allowed to reach equilibrium temperature in the mould for 10 minutes, followed by the application of a force of 5 tons for 5 minutes, followed by cooling to 100° C. over approximately 20 minutes. The plaque produced, having a thickness of 2.5 mm, was cut into specimens both along the longitudinal direction of the fibres and transverse to the direction of the fibres. Samples longitudinal to the fibre direction were cut to have dimensions 30 mm long (in the fibre direction) and 8 mm wide. Transverse samples were cut to have dimensions 45 mm long (transverse direction) and 10 mm wide. Short beam shear strength (SBSS) was measured on the longitudinal samples according to the method of ASTM D2344-72 using a loading nose diameter of 6.35 mm, a support nose diameter of 3.2 mm and a span to depth ratio of 5:1. Transverse flexural strengths (TFS) were measured according to ASTM D790 using a cross-head speed of 1 mm/minute, a span of 40 mm, a loading nose diameter of 5 mm, a support nose diameter of 5 mm. The following values were obtained as the average of 4 results in comparison with prepreg moulded in the same way and differing only in that it had not been coated with the wetting agent/potassium carbonate mixture:

|  | SBSS ($MN/m^2$) | | TFS ($MN/m^2$) | |
|---|---|---|---|---|
|  | As moulded | After 24 hr in boiling water | As moulded | After 24 hr in boiling water |
| Untreated Prepreg | Typically | −90-98 | Typically | 70-90 |
| Treated Prepreg | 101 | 102 | 123(8) | 122(7) |

EXAMPLE 5

In this example a number of alkaline salts were applied to continuous carbon fibre roving prior to its use in the pultrusion process described in European Patent Application No. 56703. Carbon fibre roving containing 2000 continuous filament, obtained from Hercules Corporation as AS4 was coated with the various salts listed in the table below by pulling the roving through a bath containing an aqueous solution of the metal salt at 30 cm/min. The concentration of salt used varied between 0.05% and 0.5% by weight of the solution, concentrations at the lower end of the range being preferred. The roving picked up approximately 36% by weight of solution. The roving was then dried and used as described in Example 32 of European Patent Publication No. 56703 to provide prepreg strip with a polyetheretherketone matrix. For evaluation purposes samples were compression moulded from these strips as described in Example 4 above and tested according to the methods described therein.

EXAMPLE 6

A carbon fibre tow (Toray 6K of T300 type) was impregnated with poly(ether ether ketone) of melt viscosity 25 $Ns/m^2$ measured at a shear rate of 1,000 $sec^{-1}$ at 400° C. as described in European Patent Publication No. 56703, after the carbon fibre had been pretreated as detailed in the table below. The pretreatment was carried out by passing the fibre tow through a bath containing the aqueous alkaline solutions listed. In addition, a control run (A) was performed using water as the pretreatment. A comparison run (F) was performed without fibre pretreatment using a poly(ether ether ketone) having a melt viscosity of 102 $Ns/m^2$ (measured at 400° C. at a shear rate of 1,000 $sec^{-1}$) in a 1:1 weight admixture with diphenyl sulphone to act as a melt plasticiser. The Toray carbon fibre is believed to be substantially free from alkaline salts or precursors which can cause an increase in the molecular weight of the poly(aryl ether). The sodium content was measured as less than 10 ppm (on the ash from the fibre).

X-ray fluorescence measurements were used to measure the relative potassium contents introduced into the prepreg. Absolute values were determined by emission spectroscopy analysis of ashed samples.

The tow was impregnated according to the procedure of Example 32 of European Patent Publication No. 56703. The product was obtained in the form of a continuous band about 50 mm wide and 0.13 mm thick. The product contained about 62% by weight of carbon fibre.

The continuous product was cut into 15 cm lengths and formed into a consolidated plaque by laying up 20 strips in a matched metal mould. The moulding was performed by placing the mould in a press for 15 minutes at 400° C. to reach equilibrium and subsequently consolidating under a pressure of 5 tons for 5 minutes before cooling to ambient temperature over a period of 15 minutes.

The DSC analysis was carried out using a Perkin Elmer DSC 1B machine at a cooling rate of 16° C./min. The analysis was carried out on 10 mg samples, heated to 420° C. on an aluminium pan for 2 minutes, before crimping the lid to contain the material in a fixed position during the cooling cycle.

The short beam shear strength and the transverse flexural strength of the mouldings were measured as described in Example 4 on four samples per run.

TABLE

| Run | Melt Viscosity of PEEK $Ns/m^2$ | Salt concentration in pretreatment bath (% by wt of composite) | SBSS $MN/m^2$ | | TFS $MN/m^2$ |
|---|---|---|---|---|---|
|  |  |  | As moulded | After 24 hours in boiling water |  |
| 1 | 33 | 0.5 KOH | 94 | 97 | 100(12) |
| 2 | 21 | 1.0 KOH | 101 | 90 | 127 (9) |
| 3 | 33 | 0.17 $K_2CO_3$ | 98 | 98 | 132 (7) |
| 4 | 33 | As (3) +0.2 polyethylene oxide | 103 | 99 | 138(16) |
| 5 | 33 | 0.1 $K_2CO_3$ | 95 | — | 119 (7) |
| 6 | 33 | 0.1 LiOH | 97 | 104 | 107 (2) |
| 7 | 33 | 0.2 KOH | 98 | 98 | 127 (7) |
| 8 | 33 | Control | 92 | 59 | 81 (8) |

The figures in brackets in the TFS column are the standard deviations from the quoted figure.

| Run | Fibre Treatment | XRF level of K in prepreg (counts/sec) | K concentration ppm by weight of prepreg | SBSS (MN/m$^2$) Ambient | SBSS (MN/m$^2$) After 24 hr boil in water | TFS (MN/m$^2$) Ambient | TFS (MN/m$^2$) After 24 hr boil in water |
|---|---|---|---|---|---|---|---|
| A | Water | 1,200 | — | 106 | 102 | 83* | 82 |
| B | 0.05% K$_2$CO$_3$ aqueous solution | 12,000 | 120 | 108 | — | 112** | — |
| C | 0.1% K$_2$CO$_3$ (aq) | 23,700 | 220 | 109 | 107 | 124* | 119 |
| D | 0.2% K$_2$CO$_3$ (aq) | 47,000 | 400 | 106 | 106 | 142(12) | 129(12) |
| E | 0.5 K$_2$CO$_3$ (aq) | 97,000 | 680 | 95 | 97.5 | 168(7) | 156(5) |
| F | Plasticiser Process | — | 11 | 100 | 102 | 152(6) | 149(8) |

*Only two specimens tested: remaining two cracked before testing.
**One sample cracked before testing.
Figures in brackets are standard deviations.

Although the short beam shear strength values show little consistent numerical trend there is a very marked difference in the mode of failure. Control sample A failed by way of interlaminar cracks indicating a brittle matrix polymer or possibly a poor interface. Comparison sample F failed by way of a tensile break. Samples D and E failed in a similar manner to sample F indicating that they were of considerably higher molecular weight than control sample A. Samples B and C showed a progression towards the failure behaviour of sample F indicating some increase in molecular weight.

The TFS results indicate a marked increase in value as the potassium salt concentration is raised. The effect is even more significant than that indicated from the figures because in runs A to C some samples were not tested because of premature cracking.

The DSC values obtained were as follows.

| | Prepreg | | | Moulded Composite | | |
|---|---|---|---|---|---|---|
| Run | Ts °C. | Tc °C. | Ts − Tc °C. | Ts °C. | Tc °C. | Ts − Tc °C. |
| A | 300.7 | 283.6 | 6.1 | 301.2 | 296.2 | 5.0 |
| D | 301.0 | 293.4 | 7.6 | 300.3 | 293.7 | 6.6 |
| E | 299.9 | 291.8 | 8.1 | 288.8 | 278.9 | 9.9 |

These results indicate in increasing difference between the Tc values for the prepreg and the moulding as the concentration of alkaline salt is increased. The difference between Ts and Tc also increases with increasing alkaline salt concentration.

In order to determine whether the molecular weight of the above products will increase with a further heat treatment above the melt temperature the procedure of forming a consolidated moulding from a prepreg can be extended so that the article is held at 400° C. for a desired longer period. A sample of run D, prepared using 0.2% potassium carbonate was held at 400° C. for 60 minutes in the mould instead of 5 minutes. The resulting product had a short beam shear strength of 111 MN/m$^2$ (with the same mode of failure as the original sample), a transverse flexural strength of 145 MN/m$^2$ (standard deviation 8). A comparison of DSC behaviour between the 5 minute and 60 minute samples gave the following values:

| | Ts | Tc | Ts − Tc (°C.) |
|---|---|---|---|
| Sample D (5 min) | 300.8 | 295.3 | 5.5 |

-continued

| | Ts | Tc | Ts − Tc (°C.) |
|---|---|---|---|
| Sample D (60 min) | 299.5 | 293.7 | 5.8 |

These values indicate that the product of run D remains essentially unchanged after an extensive heat treatment and that no further increase in molecular weight occurs after the prepreg has been consolidated over 5 minutes at 400° C.

EXAMPLE 7

The melt flow procedure of Example 3 was used to evaluate the effect of 0.1% by weight of potassium carbonate on poly(ether ether ketones) of different melt viscosity (measured at 400° C. at a shear rate of 1,000 sec$^{-1}$). The table below indicates that the higher the melt viscosity the less effective is the alkaline salt for increasing molecular weight (decreasing melt flow rate).

| | Melt Flow Index (g/10 min) at time (min) | | |
|---|---|---|---|
| Sample | 5 | 15 | 30 |
| (a) PEEK ($\eta$ = 51 Ns/m$^2$) | 25.3 | 24.3 | 24.0 |
| (b) As (a) + 0.1% K$_2$CO$_3$ | 12.9 | 9.4 | 4.9 |
| (c) PEEK ($\eta$ = 129 Ns/m$^2$) | 9.5 | 9.4 | 8.8 |
| (d) As (c) + 0.1% K$_2$CO$_3$ | 7.5 | 6.5 | 6.3 |

EXAMPLE 8

This example illustrates the use of the method in which a polyetheretherketone having an end group of formula —CO—Ph—F is increased in molecular weight by use of an alkaline salt in the presence of low molecular weight reagents which also have halogen end groups. The reagents used were respectively

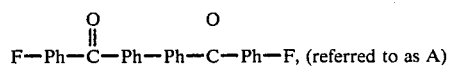

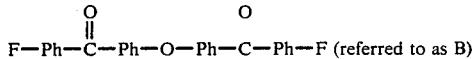

and

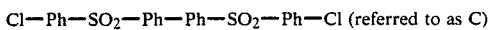

These materials have the additional benefit that they can act as melt plasticisers and are therefore particularly useful in the context of impregnating reinforcing fibres.

The polymer used was a polyetherether ketone having a melt viscosity of between 30 and 40 $Ns/m^2$ at 400° C.

Compositions of this polymer, 5.1% by weight of the polymer of each of the various plasticisers and 1.5% by weight of polymer of potassium carbonate were blended and then evaluated in the procedure of Example 3 to determine the effect on melt flow rate.

| Sample | Melt Flow Index (g/10 min) at time (min) | | |
|---|---|---|---|
| | 5 | 15 | 30 |
| PEEK + A | 50.5 | 49.7 | 50.4 |
| PEEK + A + 1.5% $K_2CO_3$ | 16.3 | 10.2 | 5.1 |
| PEEK + B | 58.5 | 53.5 | 57.6 |
| PEEK + B + 1.5 $K_2CO_3$ | 11.6 | 9.3 | 9.1 |
| PEEK + C | 55.5 | 57.1 | 57.0 |
| PEEK + C + 1.5 $K_2CO_3$ | 8.3 | 5.3 | 4.7 |

EXAMPLE 9

A polyetheretherketone copolymer having the repeat units —Ph—O—Ph—CO—Ph—O— and —O—Ph—Ph—O— in the weight proportions approximately 9:1, and having a melt viscosity of 49 $Ns/m^2$ at a shear rate of 1,000 $sec^{-1}$ at a temperature of 400° C. was mixed with 0.1% by weight of potassium carbonate and evaluated as described in Example 3.

| Sample | Melt Flow Index (g/10 min) at time (min) | | |
|---|---|---|---|
| | 5 | 15 | 30 |
| (a) PEEK copolymer | 58.6 | 59.1 | 60.1 |
| (b) a + 0.1% $K_2CO_3$ | 49.5 | 45.9 | 43.3 |

EXAMPLE 10

A sample of a polyetherketone having the repeat unit —Ph—O—Ph—CO— and a melt viscosity at 12 $Ns/m^2$ (measured at a shear rate of 1,000 $sec^{-1}$ at a temperature of 400° C.) was mixed with various concentrations of potassium carbonate. The effect of the alkaline salt on chain extension was determined as described in Example 3 except in that a temperature of 420° C. was employed. The results obtained were as follows.

| Sample | Melt Flow Index (g/10 min) at time (min) | | |
|---|---|---|---|
| | 5 | 15 | 30 |
| (a) PEK | 160 | 160 | 160 |
| (b) a + 0.1% $K_2CO_3$ | 142 | 130 | 100 |
| (c) a + 0.5% $K_2CO_3$ | 69 | 41.3 | 32 |

EXAMPLE 11

The procedure of Example 3 was used to evaluate the effect of various alkaline salts in promoting an increase in molecular weight of low molecular weight polyetheretherketone (PEEK) at concentrations of up to 0.5% by weight of salt. Potassium hydroxide, potassium nitrite, potassium fluoride, sodium hydroxide, sodium sulphide, sodium nitrite and lithium hydroxide were found to have some effect. Potassium and sodium sulphites and the sodium salt of saccharin were found to be ineffective. In the case of the latter salt it is believed to be not sufficiently thermally stable to provide an active nucleophilic species.

We claim:

1. A method of increasing the molecular weight of a poly(aryl ether) comprising providing a mixture of (1) at least one polyaryl ether comprising polymer chains having end groups selected from groups of the formula —Ar—X, and —Ar—OZ and (2) a reagent having nucleophilic activity selected from reagents having radicals —X and —OZ, reactive respectively with the end groups —AR—OZ and —Ar—X, wherein when the end group is —AR—X the reagent is either (a) a difunctional reagent having either both end groups in the form of reactive —OZ groups or (b) a difunctional reagent having one reactive —OZ group and one reactive —X group and when the end group is —Ar—OZ the reagent is a difunctional reagent having end groups —X, and wherein Ar represents an arylene radical and X is a monovalent radical capable of nucleophilic displacement from Ar and Z is a univalent metal, and heating the mixture to a temperature above the melting point of the polymer until a desired increase in molecular weight has occurred.

2. A method according to claim 1 wherein the polymer end group —Ar—X is of formula —Y—Ar—X where Y is an electron withdrawing group, which when Ar is phenylene is positioned ortho or para to the —X group and when Ar is not phenylene X and Y are attached to the Ar group by parallel and oppositely directed bonds.

3. A method according to claim 1 where the poly(aryl ether) has a melt viscosity between 5 and 100 $Ns/m^2$ measured at a shear rate of 1,000 $sec^{hu -1}$ and at a temperature below the decomposition temperature of the polymer.

4. A method according to claim 1 in which the mixture includes reinforcing fibres.

5. Articles produced from the compositions made according to claim 1.

6. A method as set forth in claim 1 wherein Ar is a phenylene radical.

7. A method as set forth in claim 1 wherein X is selected from the group consisting of halogen, nitrile (CN) and nitro ($NO_2$).

* * * * *

UNITED STATES PATENT AND TRADEMARK OFFICE
CERTIFICATE OF CORRECTION

PATENT NO. : 4,722,980

DATED : February 2, 1988

INVENTOR(S) : Mary V. Ward; Eric Nield, & Philip A. Staniland

It is certified that error appears in the above-identified patent and that said Letters Patent is hereby corrected as shown below:

Column 16, line 49 (Claim 3, line 3) to change "1,000 sec $^{hu-1}$" to --1,000 sec $^{-1}$--.

Signed and Sealed this

Nineteenth Day of July, 1988

Attest:

DONALD J. QUIGG

Attesting Officer

Commissioner of Patents and Trademarks